(No Model.)
F. W. DICK & J. FLEMING.
VALVE.
No. 328,390.  Patented Oct. 13, 1885.
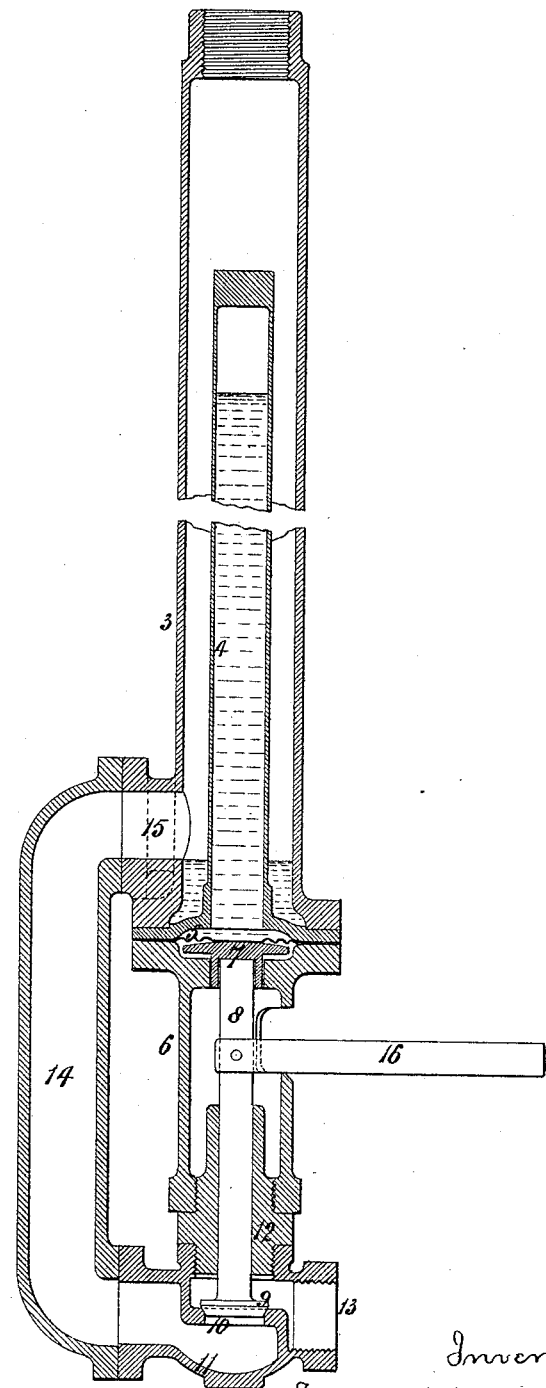
Witnesses:
John E. Parker
James J. Tobin
Inventors:
Frank W. Dick & James Fleming
by their attorneys,
Howson & Son

United States Patent Office.

FRANK WESLEY DICK AND JAMES FLEMING, OF GLASGOW, COUNTY OF LANARK, SCOTLAND.

VALVE.

SPECIFICATION forming part of Letters Patent No. 328,390, dated October 13, 1885.

Application filed June 3, 1885. Serial No. 167,510. (No model.) Patented in France February 26, 1884, No. 160,574; in England February 28, 1884, No. 4,049, and in Germany March 5, 1884, No. 29,838.

*To all whom it may concern:*

Be it known that we, FRANK WESLEY DICK and JAMES FLEMING, subjects of the Queen of Great Britain and Ireland, and residents of Glasgow, in the county of Lanark, Scotland, have invented certain Improved Apparatus for Automatically Controlling a Valve for Discharging or Supplying Liquid, (for which we have obtained patents in Great Britain, No. 4,049, February 28, 1884; in France, No. 160,574, February 26, 1884, and in Germany, No. 29,838, March 5, 1884,) of which the following is a specification.

Our said invention has for its object to construct and combine apparatus in an improved manner for automatically controlling the action of a valve in accordance with changes of temperature. Such valve may be that of a steam-trap, or it may be a valve for supplying or discharging water or other liquid. The improved apparatus is simple in its construction and action, and we believe it to be less liable than existing apparatus to become deranged or ineffective.

Our said invention may be used for various purposes—such as to maintain water (in a bath, for instance) at an approximately constant temperature. The apparatus may also be used for controlling a valve by which cold water is supplied, the valve being arranged to open when the confining-tube is subjected to increased heat instead of closing, as in the steam-trap, and in the arrangement for controlling the supply of hot water.

Our improved apparatus, constructed to act as a steam-trap, is shown in vertical section on the accompanying sheet of explanatory drawings.

A vessel, 3, of a cylindrical form and placed vertically, is shown, for receiving at the top the water of condensation which drains from steam-pipes or other apparatus heated by steam. Inside this vessel 3 is a tube or vessel, 4, with its lower end flanged, which tube 4 is the tube or vessel in which a fluid is confined for the purpose of our invention, such fluid being water in the case of a steam-trap. A flexible diaphragm, 5, of copper, rubber, or any suitable material, which may be made with or without slight annular corrugations is placed across the mouth of the vessel 4. The flanged end of the tube 4 and the flexible diaphragm are held between a flange formed on the lower end of the vessel 3 and a flange on the upper end of a box, 6, placed immediately beneath the vessel 3. The under side of the diaphragm 5 rests on a disk, 7, which bears on the top of a spindle, 8. This spindle has on its lower end a conical valve, 9, for closing a valve seat or opening, 10, in a valve-box, 11, and is partly inclosed by an intermediate piece, 12, which enters up and is screwed at about its middle into the bottom of the box 6. The valve-box 11 is screwed to the lower end of this piece 12, and it may have a discharge-outlet, 13, at one side, being connected at the other side by a pipe, 14, to a discharge-outlet, 15, in the vessel 3, placed at one side and a little above the bottom of this vessel.

Near the top of the spindle 8 is fitted a key or handle, 16, which projects through an opening in the side of the box 6, by means of which handle the spindle 8 and valve 9 can be turned for the purposes of keeping the surfaces of the valve and seat in order.

The apparatus may be adjusted by weighting the valve 9 and spindle 8 (more or less) or by applying a spring.

When steam occupies the part of the vessel 3 above the outlet 15, the heat acting through the metal of the tube 4 on the confined fluid induces a pressure, which, acting on the diaphragm 5, presses downward the valve-spindle 8, and closes the valve 9 down on its seat 10; but when the water of condensation, draining into the vessel 3, begins to accumulate therein and in the pipe 14, the heating action on the tube 4 and its contents becomes diminished, and the consequent contraction of the confined fluid allows the diaphragm 5 to assume its normal position, and the weight of water acting on the face of the valve will force it open, and the water will escape through the valve seat 10 and discharge-orifice 13.

What we claim as our invention is—

1. The combination of a closed tube, 4, a diaphragm therefor, and an inclosing-vessel, with a valve-box, 11, and a valve, 9, therefor, on the stem of which valve the said diaphragm acts, substantially as set forth.

2. The combination of a closed tube, a diaphragm therefor, and an inclosing-vessel, 3, with a valve-box, 11, a valve, 9, acted on by said diaphragm, and a pipe, 14, connecting the valve-box with the inclosing-vessel, substantially as set forth.

3. The combination of a closed tube, a diaphragm therefor, and an inclosing-vessel, with a valve-box, 11, a valve, 9, therein having a stem acted on by said diaphragm, and a handle, 16, connected to the valve-stem, as and for the purpose described.

In testimony whereof we have signed our names to this specification in the presence of two subscribing witnesses.

FRANK W. DICK.
JAMES FLEMING.

Witnesses:
EDMUND HUNT,
ROBT. KINNIBURGH.